June 7, 1932.   J. M. BARSTOW   1,862,458
MEASURING APPARATUS
Filed Oct. 29, 1930
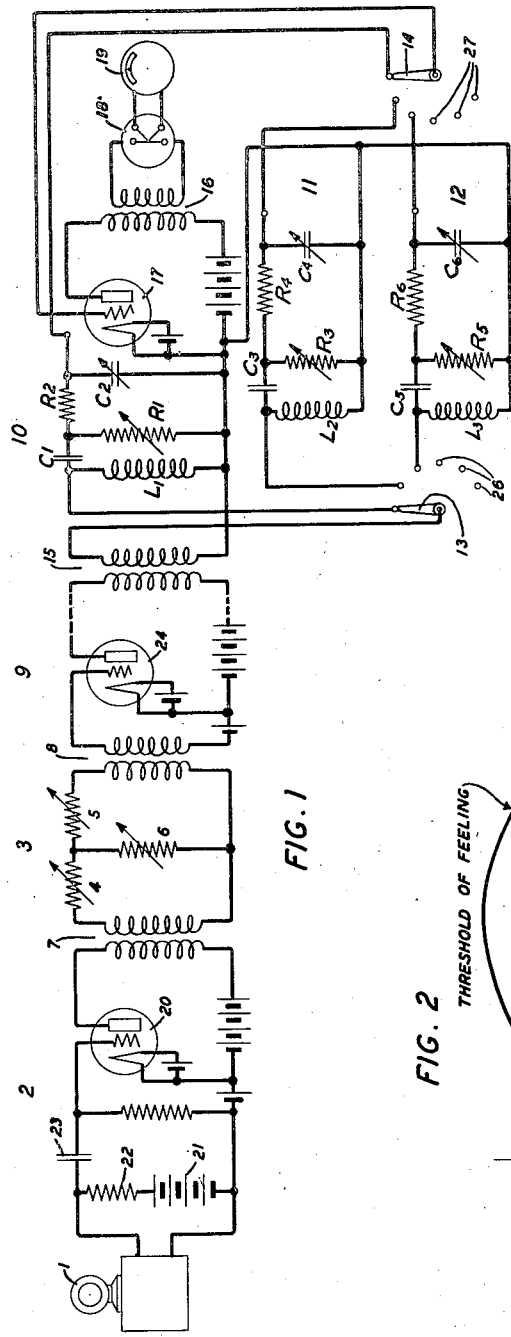
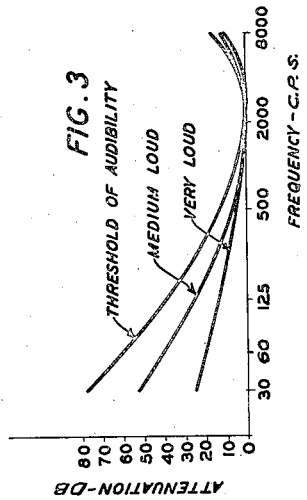
INVENTOR
J. M. BARSTOW
BY
ATTORNEY Patented June 7, 1932

1,862,458

UNITED STATES PATENT OFFICE

JOHN M. BARSTOW, OF MOUNTAIN LAKES, NEW JERSEY, ASSIGNOR TO AMERICAN TELEPHONE AND TELEGRAPH COMPANY, A CORPORATION OF NEW YORK

MEASURING APPARATUS

Application filed October 29, 1930. Serial No. 492,066.

This invention relates to acoustic measurement and particularly to apparatus for measuring the loudness of sounds.

It is an object of the present invention to improve the accuracy of loudness indicating devices.

One method used heretofore in measuring the loudness of a sound has been to convert the sound waves into electrical waves and then to determine the energy level of the latter. While the indication of the ordinary energy measuring device is dependent only on the absolute energy level of the waves, the psychological effect of the sound waves on the auditory system is dependent more on the difference between the energy level of the waves and the energy level at which the ear is just responsive. The latter level is not the same at every frequency but varies through a large range, reaching a minimum at a frequency of the order of two thousand cycles per second.

It has been the practice in the design of measuring apparatus to correct for this variation by providing a network having a characteristic approximating the curve of minimum audibility, thereby attenuating the waves of different frequencies to values more nearly commensurate with their effects on the ear.

It has been discovered, however, that the difference between the energy level of a sound and the energy level at the threshold of audibility is not an exact measure of the loudness of the sound, and that at low frequencies a given difference in energy level produces a greater loudness effect than it does at higher frequencies. Cognizance is taken of this physical fact in the volume control system described in U. S. Patent No. 1,788,035, which issued on January 6, 1931 to G. H. Stevenson, wherein, to decrease the volume of sound issuing from a reproducer, waves of low frequency are attenuated to a lesser degree than those of higher frequency in order to retain them at substantially the same relative energy level above the threshold of minimum audibility.

In accordance with the present invention the waves applied to a loudness measuring circuit are weighted by attenuating networks as a function of their frequencies to correct for the variable relation between the loudness of a sound and the difference between its energy level and that at threshold. The weighting function to be used for accurate measurements is not a fixed one, but varies with the loudness of the sound being measured, just as the sensitivity of the human auditory system at different frequencies varies with the loudness of the sounds applied to it. To accommodate a wide range of loudness levels, the present invention provides a plurality of different weighting networks or a single, continuously adjustable network.

A more detailed explanation of the invention follows in connection with the description of a noise level measuring set employing a specific embodiment of the invention. Reference will be made to the drawing in which Figure 1 is a schematic diagram of a loudness measuring apparatus embodying the invention;

Fig. 2 shows in graphical form the characteristics of the ear with which the present invention is concerned; and Fig. 3 shows the curves from which the characteristics of the attenuating networks are derived.

Fig. 1 shows an apparatus that is adapted to measurement of the loudness of pure tones and such complex sounds as speech, music, and noise. A sound pick-up device of any suitable type, represented by condenser microphone 1, translates into electrical waves the sound waves which are to be measured. Since the apparatus disclosed in this invention actually measures the electrical input, the procedure of operation would not differ if a source of electrical waves of audio-frequency is substituted for the condenser microphone 1. This could be done in case it is desired to measure the level of electrical interference, such as noise in a telephone circuit. The level of the electrical waves is raised by an amplifier, such as the conventional single stage, resistance coupled amplifier 2, comprising condenser 23, resistance 22, batteries 21, and vacuum tube 20 as the strength of the applied waves may require. The waves are then passed, by means of transformer 7, through a calibrated attenuating circuit 3 comprising two variable series resistance elements 4 and 5, and a variable shunt resistance 6. The specific attenuator illustrated may be replaced by any device which will permit a known attenuation, uniform for all frequencies, to be introduced into the circuit.

Following the variable uniform attenuator 3 in the circuit and connected to it by transformer 8, is vacuum tube amplifier 9. Next in the circuit, is transformer 15 connecting one of the weighting networks 10, 11, and 12, which may be interchanged as desired by means of the switches 13 and 14. If additional weighting networks are desired, they may be connected to the circuit as indicated by the contact points 26 and 27. The function of the networks is to make the meter simulate more closely, in its response to electrical waves, the response of the human ear to the original, equivalent sound waves. Each network is represented as comprising one inductive element, such as $L_1$, $L_2$, or $L_3$; two resistances, such as $R_1$, $R_2$, $R_3$, $R_4$, $R_5$, or $R_6$; and two condensers, such as $C_1$, $C_2$, $C_3$, $C_4$, $C_5$, or $C_6$. All of the parts in the networks, are so proportioned that the resultant frequency-attenuation characteristics bear a particular relation to the loudness characteristics of the human ear, as will be described hereinafter. Separate networks have been provided for measuring loud, soft, and medium loud sounds. However, the elements $C_1$ and $C_2$, or $R_1$ and $C_2$, of network 10 and corresponding elements of the other networks may be made variable. Thus the characteristic of any weighting network can be shaped as required. In place of the particular type of networks shown, any other having approximately the same frequency-attenuation characteristics may be employed. The attenuated signals, passing from weighting network 10, are translated through vacuum tube 17 and transformer 16 to a meter circuit, which is illustrated as comprising thermocouple 18 and microammeter 19 which may be calibrated to read in terms of the energy level of the signals applied to it.

In the reference condition, i. e., with sound waves of threshold level striking the microphone and with the attenuator set at zero or some other fixed value, the microammeter indicator stands at some point on the scale, which may be taken as the reference point. As the level of the sound is raised a number of units and the meter indication tends to rise correspondingly, the indicator is held at the reference point by increasing the number of units introduced by attenuator 3. If the attenuator units are too large to permit an exact adjustment, the rise in the meter reading is added to the number of attenuation units inserted and the sum is taken as a measure of the loudness of the applied sound waves. The use of a calibrated meter also enables the operator to note rapid variations in the sound level that could not be followed by repeatedly adjusting the attenuator.

The function of the weighting networks 10, 11, and 12 will be better understood by considering Fig. 2 in which is indicated graphically how the energy level required to produce a given sensation of loudness, varies with frequency. Frequencies, expressed in cycles per second are represented by the abscissæ; and relative intensity level, expressed in decibels, are represented by the ordinates, the scale of which, since actual intensity levels are not shown, has its zero placed on the same horizontal level as the lowest point of the threshold of audibility curve, said horizontal level being known as the reference level. It should be borne in mind that the terms "intensity" and "energy" are used synonymously in this application. The bottom curve is the familar threshold of audibility curve, or curve of zero loudness. This curve indicates the energy level at which a sound wave is just audible. First above this curve minimum audibility is a curve showing how the energy content of a medium-loud tone must vary, as its frequency is changed, for it to retain the same loudness effect on the ear. The next curve gives the same information for a very loud tone. The top curve is called the threshold of feeling because intensities higher than those shown on this curve are painful to the hearing mechanism.

Heretofore in the design of measuring devices intended to simulate the response of the ear to sounds of various intensities only a single frequency weighting characteristic has been used, as far as applicant is aware. The inherent inaccuracy of such devices can be seen by examining Fig. 2 and observing that to change from a very soft, practically inaudible, tone to a medium loud tone a greater change in the intensity level is required at intermediate frequencies than at low frequencies. It likewise can be seen that a greater change is needed at intermediate frequencies than is needed at high frequencies; and that, for a given difference between two frequencies, a greater change in the intensity level is required if said frequencies are low than if they are high.

The effect of the above described auditory characteristics on the design of loudness measuring apparatus is that, whereas two pure tones may be of equal loudness, their energy content, and therefore their effect on the measuring apparatus, may be very different. For example, a medium loud tone of two thousand cycles per second is approximately forty units above the reference level, whereas another tone of equal loudness, but of sixty cycles per second, is almost eighty units above the reference level. That is, although the sounds are equally loud, the meter would indicate that the one of lower frequency was of the order of forty units louder than that of higher frequency. If, before being applied to the meter, the sixty cycle wave were attenuated forty units, the meter would give approximately the same indication for each. The compensating attenuation to be introduced at other frequencies is obtained in a similar manner from the curve.

The curves shown in Fig. 3 are similar to those shown in Fig. 2, but they are arranged in inverse order. The ordinates are derived from the curves of Fig. 2 in the manner described in the preceding paragraph. For measuring sounds of medium loudness, therefore, a filter network having a characteristic approximating that of the "medium loud" curve of Fig. 3 is used. From both Fig. 2 and Fig. 3 it can be seen that for very loud sounds a correction of about twenty units is required at sixty cycles, and that for very soft sounds near the threshold of audibility the correction is in the order of sixty units. Thus it is evident that the characteristic of the particular filter to be used depends on the loudness of the sound to be measured; consequently, as many different filters may be used as the range of sound levels to be measured and the requisite accuracy demand. It will be found, however, that for most purposes the error resulting from the use of only two or three weighting networks will not be objectionable.

For simplicity's sake, the preceding theoretical discussion has been restricted to the measurement of pure tones. The theory, however, is not to be taken as a limitation of the invention, which may be applied to advantage in the measurement of complex sounds of various kinds, but it is presented only as a rational basis for exposition of the invention. While a particular type of measuring set has been described, it is to be understood that the invention is not limited thereto, but may be embodied in apparatus of widely different form without exceeding the scope of the invention as defined by the appended claims.

What is claimed is:

1. In combination with a source of sound waves and means for converting them into electrical waves, an indicating device responding in accordance with the energy level of the electrical waves applied thereto, and means to weight said electrical waves in their effect on said indicating device in accordance with the loudness of said equivalent sound waves.

2. A system for measuring the loudness of sounds, said system comprising means to convert sound waves into electrical waves, and means to weight said electrical waves in accordance with their frequencies and the loudness level of the sound which is being measured.

3. In combination with an electrical circuit in which the flow of current corresponds to sound waves which have been applied to a sound pick-up device connected to the circuit, a loudness measuring circuit comprising means to weight the electrical waves in said circuit differently at different levels of loudness of said corresponding sound waves in accordance with the frequency-intensity level characteristics of the ear at said different loudness levels.

4. A loudness measuring system comprising means to convert sound waves into electrical waves, calibrated means for attenuating said waves to a selected reference level of energy, said means comprising an attenuation network having a characteristic which is substantially the same as the ear's frequency-energy response curve of equal loudness at the particular loudness level being determined, and means for indicating when said attenuated waves are at said reference level.

5. In a loudness measuring set, means for converting sound waves into electrical waves, means for uniformly attenuating said electrical waves a known amount, means to correct the variations in intensity level of a sound of constant loudness as the frequency of said sound varies, said means comprising an attenuating network of non-uniform characteristic, and means to indicate when said waves are attenuated to a predetermined reference level.

6. A system in accordance with claim 5 in which said uniform attenuation is increased in steps and said indicating means is calibrated to show the difference between the level of the waves applied to it and said reference loudness level.

7. A system in accordance with claim 5 in which the characteristic of said attenuating network is continuously variable.

8. In a loudness measuring system, means for converting sound waves into electrical waves, means connected thereto for weighting said electrical waves according to the loudness characteristics of their equivalent sound waves, and means attached thereto for indicating the energy level of the electrical waves.

9. A system for measuring the loudness of sound, said system comprising means for converting sound waves into electrical waves, means connected thereto for weighting said electrical waves according to the loudness of their equivalent sound waves, said means comprising a plurality of weighting networks, each of which has a different characteristic, and means connected thereto for indicating the energy level of the electrical waves.

10. A sound meter comprising means for converting sound waves into electrical waves, means connected thereto for weighting said electrical waves according to the loudness of their equivalent sound waves, said means comprising a plurality of weighting networks each of which has a different characteristic, said characteristics being comparable to various equal loudness curves which depict the reaction of the ear to different sounds, and means attached thereto for indicating the energy level of the electrical waves.

11. An indicating device which comprises means for simulating the response of the ear to sounds of various intensities, said means consisting of a plurality of weighting networks, each having a different characteristic, for weighting electrical waves in accordance with the loudness of their equivalent sound waves.

In testimony whereof, I have signed my name to this specification this 28th day of October 1930.

JOHN M. BARSTOW.